Sept. 28, 1937.   L. B. AVERY   2,094,114
CAP LOOSENER FOR FRUIT JARS
Filed Dec. 30, 1936
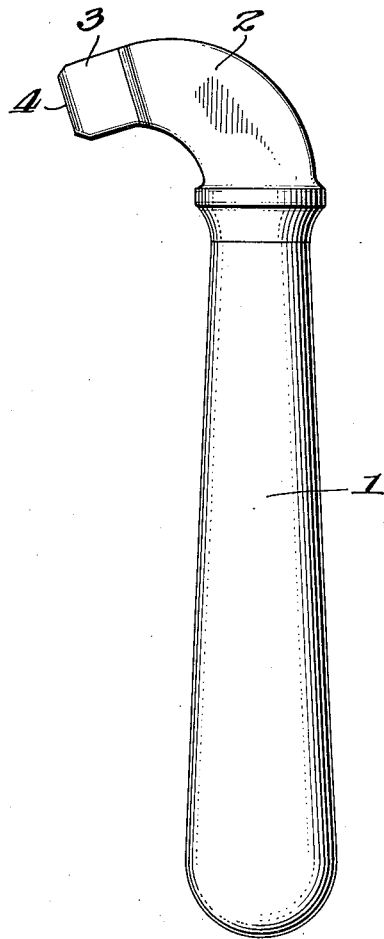
Inventor:
Lewis B. Avery Patented Sept. 28, 1937

2,094,114

UNITED STATES PATENT OFFICE 2,094,114

CAP LOOSENER FOR FRUIT JARS

Lewis B. Avery, Bridgewater Township, Washtenaw County, Mich.

Application December 30, 1936, Serial No. 118,342

1 Claim. (Cl. 81—3.1)

The object of my invention is to provide a safe, simple, inexpensive, and efficient device for loosening the caps of fruit jars, which, with their accompanying rubbers have become cemented down to the shoulders of the jars by the drying of the fruit juices between them, and without bending up the edges of the jar caps.

I attain this object by the mechanism illustrated in the accompanying drawing, in which—

Figure 1 is a top view of the blade only, and Fig. 2 is a side view of the blade and handle.

Similar numerals refer to similar parts throughout the several views.

This device consists of a handle 1 and a short blade of two parts 2, 3, and is similar to a bent screw-driver blade. This blade is preferably bent or curved in outline at a right angle, more or less, to the handle 1, as shown. The free end of the part 3 is very thin, though not necessarily very sharp, and its thickness increases slightly for about ⅜" back to the part 2, which may be as thick as an ordinary case knife blade, or thicker. The part 3 is made as thin as possible consistent with strength so that it may be crowded under the rubber on a fruit jar when the cap is screwed down tightly without bending up the edge of the cap; and it must therefore be made of tough material that will not bend or break under ordinary use. Without much difficulty, this blade 3 may be inserted under the jar rubber and worked around and between the shoulder of the jar and its rubber, which will so loosen the rubber that the jar cap may be easily unscrewed by hand. The reduced portion of the blade is substantially at a right angle to the handle and the operating edge 4 of the blade forms an acute angle with the longitudinal axis of said handle.

Fruit jar caps with their rubbers often become so thoroughly cemented to the tops of the jars that it is impossible to remove them by hand alone, and even the various kinds of fruit jar wrenches now in use often prove to be useless for the purpose; and ordinary table knives or screw-drivers can not be used on account of their being too blunt and thick.

The handle 1 and the blade 2, 3 may be made integral with each other, or they may be joined together as separate pieces.

I claim as my invention—

A cap loosener for fruit jars comprising a handle and a curved blade attached at one of its end portions to an end of the handle, the other end portion of this blade being substantially at a right angle to the handle, the latter end portion being reduced in thickness to form a thin operating portion whose operating edge forms an acute angle with the longitudinal axis of the handle, the thin portion of the blade being short and being made of tough material to prevent bending or breaking thereof when loosening a fruit jar cap.

LEWIS B. AVERY.